(12) United States Patent
Hu et al.

(10) Patent No.: US 12,456,168 B2
(45) Date of Patent: Oct. 28, 2025

(54) ARTIFICIAL INTELLIGENCE DEVICE AND METHOD FOR GENERATING TRAINING DATA

(71) Applicant: LG ELECTRONICS INC., Seoul (KR)

(72) Inventors: Yi Hu, Seoul (KR); Sangyun Kim, Seoul (KR); Run Cui, Seoul (KR); Hyunwoo Kim, Seoul (KR); Jaehong Eom, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 426 days.

(21) Appl. No.: 17/923,068

(22) PCT Filed: Oct. 14, 2020

(86) PCT No.: PCT/KR2020/013978
§ 371 (c)(1),
(2) Date: Nov. 3, 2022

(87) PCT Pub. No.: WO2022/080517
PCT Pub. Date: Apr. 21, 2022

(65) Prior Publication Data
US 2023/0169634 A1    Jun. 1, 2023

(51) Int. Cl.
*G06T 5/00* (2024.01)
*G06T 3/40* (2006.01)
(Continued)

(52) U.S. Cl.
CPC ............. *G06T 5/50* (2013.01); *G06T 3/40* (2013.01); *G06T 5/70* (2024.01); *G06T 7/0004* (2013.01);
(Continued)

(58) Field of Classification Search
CPC ......... G06T 2207/20081; G06T 7/0004; G06T 2207/20084; G06T 2207/30164;
(Continued)

(56) References Cited

U.S. PATENT DOCUMENTS

| 2018/0307947 A1 | 10/2018 | Choi et al. |
| 2018/0314716 A1 | 11/2018 | Kim et al. |

(Continued)

FOREIGN PATENT DOCUMENTS

| JP | 2005-156334 A | 6/2005 |
| KR | 10-2017-0044933 A | 4/2017 |

(Continued)

OTHER PUBLICATIONS

Zhang, Gongjie, et al. "Defect-GAN: High-fidelity defect synthesis for automated defect inspection." Proceedings of the IEEE/CVF Winter Conference on Applications of Computer Vision. 2021.*
(Continued)

*Primary Examiner* — Li Liu
(74) *Attorney, Agent, or Firm* — Birch, Stewart, Kolasch & Birch, LLP

(57) ABSTRACT

A product inspection apparatus including a camera configured to capture an image of a product to be inspected; and a processor configured to extract defect information from a defect indicated by the captured image of the product, generate first virtual defect data including at least one of a location, a size and a shape of the defect included in the captured image, based on the extracted defect information, generate second virtual defect data by synthesizing the first virtual defect data with non-defect data representing the product without the defect, and generate final virtual defect data by inputting the second virtual defect data to an artificial intelligence generative model.

20 Claims, 7 Drawing Sheets

(51) Int. Cl.
*G06T 5/50* (2006.01)
*G06T 5/70* (2024.01)
*G06T 7/00* (2017.01)

(52) U.S. Cl.
CPC ............ *G06T 2207/20081* (2013.01); *G06T 2207/20092* (2013.01); *G06T 2207/20221* (2013.01); *G06T 2207/30108* (2013.01)

(58) Field of Classification Search
CPC . G06T 2207/20092; G06T 2207/20221; G06T 2207/30108; G06T 7/0008; G06T 2200/24; G06T 11/00; G06N 3/04; G06N 3/045; G06V 10/82
See application file for complete search history.

(56) References Cited

U.S. PATENT DOCUMENTS

| | | | |
|---|---|---|---|
| 2019/0257767 A1* | 8/2019 | Shaubi | G06T 7/0004 |
| 2020/0134455 A1 | 4/2020 | Choi et al. | |
| 2021/0158503 A1* | 5/2021 | Li | G06F 18/214 |
| 2021/0304400 A1* | 9/2021 | Bhate | G06F 18/2148 |
| 2021/0374940 A1* | 12/2021 | Liu | G06F 18/2193 |
| 2022/0036539 A1* | 2/2022 | Brauer | G06N 3/08 |
| 2022/0044391 A1* | 2/2022 | Wallingford | G06F 18/214 |
| 2023/0196096 A1* | 6/2023 | Milne | G06F 9/5027 706/25 |

FOREIGN PATENT DOCUMENTS

| | | |
|---|---|---|
| KR | 10-2018-0120478 A | 11/2018 |
| KR | 10-2022496 B1 | 9/2019 |
| KR | 10-2020-0052453 A | 5/2020 |

OTHER PUBLICATIONS

Liu, Juhua, et al. "Multistage GAN for fabric defect detection." IEEE Transactions on Image Processing 29 (2019): 3388-3400.*

Niu, Shuanlong, et al. "Defect image sample generation with GAN for improving defect recognition." IEEE Transactions on Automation Science and Engineering 17.3 (2020): 1611-1622.*

International Search Report (PCT/ISA/210) issued in PCT/KR2020/013978, dated Jul. 6, 2021.

Luo et al., "GAN-Based Augmentation for Improving CNN Performance of Classification of Defective Photovoltaic Module Cells in Electroluminescence Images," 2019 International Conference on New Energy and Future Energy System, IOP Conf. Series: Earth and Environmental Science, vol. 354, Nov. 29, 2019, pp. 1-8 (10 pages total).

* cited by examiner

ARTIFICIAL INTELLIGENCE DEVICE AND METHOD FOR GENERATING TRAINING DATA

CROSS-REFERENCE TO RELATED APPLICATION

This application is the National Phase of PCT International Application No. PCT/KR2020/013978 filed on Oct. 14, 2020, which is hereby expressly incorporated by reference into the present application.

BACKGROUND OF THE INVENTION

Field of the Invention

The present disclosure relates to an artificial intelligence device. More particularly, the present disclosure relates to an image processing apparatus for machine learning-based vision inspection.

Discussion of the Related Art

In general, a vision inspection apparatus introduced into a product production process includes a high-performance camera, an image processor, and software. A product image is acquired using a camera and lighting, and the image processor and software determine the quality of the product through an image and analysis process.

A method of detecting an image corresponding to a defect by using an index such as a pattern, location, size, and color to determine whether a product is defective during the production process has been used. An artificial intelligence (AI) vision inspection solution including application of deep learning to improve the accuracy of image detection has also been provided.

Advanced training has also been used to improve the performance of the deep learning-based vision inspection apparatus. That is, the performance of deep learning is determined by the number of training data, the quality of training data, and a learning algorithm. Securing a large amount of high quality training data is thus needed to build a deep learning model having a certain level of reliability or higher.

However, because the number of occurrences of defects during a production process is limited, collecting defect data is difficult and there is an imbalance between non-defect data and defect data. Accordingly, there is difficulty in securing defect data for training a deep learning model used for vision inspection.

SUMMARY OF THE INVENTION

Accordingly, one object of the present invention is to address the above-noted and other related art problems.

Another of the present disclosure is to generate virtual defect data by using a small number of defect data.

Yet another of the present disclosure is to solve an imbalance between non-defect data and defect data by generating defect data that is difficult to obtain during a production process.

Still another of the present disclosure is to train a deep learning model used for vision inspection by generating virtual defect data.

According to an embodiment of the present disclosure, an image processing apparatus includes a data acquisition unit configured to acquire at least one non-defect data and at least one defect data; and a processor configured to extract defect information from the defect data and generate final virtual defect data based on the non-defect data, the defect data, and the defect information by using an artificial intelligence model.

In addition, the defect information may include at least one of regions, locations, sizes, shapes, and number of defects, and the processor is configured to perform a first operation of generating first virtual defect data by using the defect information. Further, the processor is configured to perform a second operation of generating second virtual defect data by synthesizing the first virtual defect data with the non-defect data.

In addition, the processor is configured to perform a third operation of generating the final virtual defect data by inputting the second virtual defect data to an artificial intelligence model. In the first operation, the processor of the image processing apparatus is configured to generate the first virtual defect data based on regions, sizes, locations, and number of defects received from the user input unit.

The processor of the image processing apparatus is also configured to generate the first virtual defect data by arbitrarily setting the regions, the sizes, the locations, and the number of the defects. Also, the artificial intelligence model may include a Generative Adversarial Network (GAN) model including a generative model and a discriminative model, the processor is configured to generate the final virtual defect data by inputting the second virtual defect data to the generative model, and the final virtual defect data may be blended with respect to the second virtual defect data.

The generative model may include a plurality of stages in which a result value is an input value of a next stage, the processor is configured to scale the second virtual defect data based on the number of the plurality of stages, and generate final virtual defect data by inputting the scaled second virtual defect data to the plurality of stages, and the final virtual defect data may have a higher similarity to the defect data than the second virtual defect data.

In addition, the artificial intelligence model may include a GAN model including a generative model and a discriminative model, the generative model is configured to generate final virtual defect data based on the non-defect data, the defect data, and the defect information, and the discriminative model is configured to determine whether an input image is actual data or virtual defect data.

Also, the generative model may be trained to minimize reconstruction loss of the discriminative model by inputting the defect data and degraded data based on the defect data to the discriminative model. The discriminative model can be trained to output authenticity information by determining whether the input image is actual data or virtual defect data and to minimize an error of the authenticity information.

An operating method of an image processing apparatus according to an embodiment of the present disclosure includes acquiring at least one non-defect data and at least one defect data, and extracting defect information from the defect data; and generating final virtual defect data based on the non-defect data, the defect data, and the defect information by using an artificial intelligence model.

In addition, the extracting of the defect information from the defect data and the generating of the final virtual defect data based on the non-defect data, the defect data, and the defect information by using the artificial intelligence model may include performing a first operation of generating first virtual defect data by using the defect information. The method may include performing a second operation of generating second virtual defect data by synthesizing the first virtual defect data with the non-defect data, and performing a third operation of generating the final virtual defect data by inputting the second virtual defect data to an artificial intelligence model.

Performing the third operation can include generating final virtual defect data by inputting the second virtual defect data to a generative model, and the final virtual defect data may be blended with respect to the second virtual defect data. In addition, the generating of the final virtual defect data by inputting the second virtual defect data to the generative model can include scaling the second virtual defect data based on the number of the plurality of stages, and generating final virtual defect data by inputting the scaled second virtual defect data to the plurality of stages.

Advantageous Effects

According to the present disclosure, it is possible to solve an imbalance between non-defect data and defect data by generating various virtual defect data using information included in a small number of defect data. Also, the reliability of vision inspection can be improved by generating virtual defect data and using the virtual defect data to train a deep learning model used for vision inspection.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
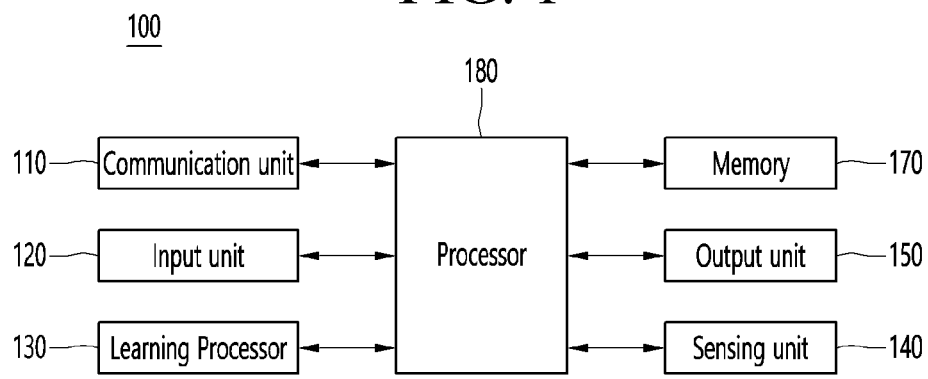
FIG. 1 is a block diagram illustrating an artificial intelligence (AI) device (100) according to an embodiment of the present disclosure.

Hereinafter, the present disclosure will be described in detail. Embodiments described below are only examples of the present disclosure, and the present disclosure may be modified in various forms. Accordingly, the specific features and functions disclosed below do not limit the scope of the claims.

Embodiments of the present disclosure are described in detail with reference to accompanying drawings and regardless of the reference symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It will be understood that the present disclosure includes all modifications, equivalents, and substitutes falling within the spirit and scope of various embodiments of the disclosure.

It will be understood that although the terms "first," "second" etc. may be used herein to describe various elements, these elements should not be limited by these terms. These terms are only used to distinguish one element from another. It will be understood that when an element is "connected" or "coupled" to another element, the element may be directly connected or coupled to the other element or may be "connected" or coupled" to the other element with an intervening element therebetween. On the other hand, it will be understood when an element is "directly connected" or "directly coupled" to another element, no intervening element is present therebetween.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and indicates a whole model of problem-solving ability including artificial neurons (nodes) forming a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. In particular, the loss function can be used as an index to determine optimal model parameters in the learning process of the artificial neural network.

Machine learning can be classified into supervised learning, unsupervised learning, and reinforcement learning according to a learning method. The supervised learning refers refers to a method of learning an artificial neural network in a state in which a label for learning data is given, and the label means the correct answer (or result value) that the artificial neural network must infer if the learning data is input to the artificial neural network. The unsupervised learning refers refers to a method of learning an artificial neural network in a state in which a label for learning data is not given. Further, the reinforcement learning refers to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot refers to a machine that automatically processes or operates a given task by its own ability. In particular, a robot having a function of recognizing an environment and performing a self-determination operation is referred to as an intelligent robot.

Robots can be classified into industrial robots, medical robots, home robots, military robots, and the like according to the use purpose or field. In more detail, a robot includes a driving unit including an actuator or a motor and can perform various physical operations such as moving a robot joint. In addition, a movable robot may include a wheel, a brake, a propeller, and the like in a driving unit, and can travel on the ground through the driving unit or fly in the air.

<Self-Driving>

Self-driving refers to a technique of driving for oneself, and a self-driving vehicle refers to a vehicle that travels without an operation of a user or with a minimum operation of a user. For example, the self-driving includes a technology for maintaining a lane while driving, a technology for automatically adjusting a speed, such as adaptive cruise control, a technique for automatically traveling along a predetermined path, and a technology for automatically setting and traveling a path if a destination is set.

A vehicle can be a vehicle having only an internal combustion engine, a hybrid vehicle having an internal combustion engine and an electric motor together, and an electric vehicle having only an electric motor, and may include not only an automobile but also a train, a motorcycle, and the like. A self-driving vehicle can also be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner. The XR technology can be applied to a head-mount display (HMD), a head-up display (HUD), a mobile phone, a tablet PC, a laptop, a desktop, a TV, a digital signage, and the like. A device to which the XR technology is applied is referred to as an XR device.

FIG. 1 is a block diagram illustrating an AI device 100 according to an embodiment of the present disclosure. The AI device (or an AI apparatus) 100 can be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 include a communication unit 110, an input unit 120, a learning processor 130, a sensing unit 140, an output unit 150, a memory 170, and a processor 180. The communication unit 110 can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

Further, the communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

Also, the input unit 120 can acquire various kinds of data and may include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

Further, the input unit 120 can acquire a learning data for model learning and an input data to be used if an output is acquired by using learning model. The input unit 120 can also acquire raw input data. In this instance, the processor 180 or the learning processor 130 can extract an input feature by preprocessing the input data.

The learning processor 130 can learn a model composed of an artificial neural network by using learning data. In particular, the learned artificial neural network can be referred to as a learning model. Also, the learning model can be used to an infer result value for new input data rather than learning data, and the inferred value can be used as a basis for determination to perform a certain operation.

In addition, the learning processor 130 can perform AI processing together with the learning processor 240 of the AI server 200. In this instance, the learning processor 130 may include a memory integrated or implemented in the AI device 100. Alternatively, the learning processor 130 may be implemented by using the memory 170, an external memory directly connected to the AI device 100, or a memory held in an external device.

In addition, the sensing unit 140 can acquire at least one of internal information about the AI device 100, ambient environment information about the AI device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

Further, the output unit 150 can generate an output related to a visual sense, an auditory sense, or a haptic sense. The output unit 150 may include a display unit for outputting time information, a speaker for outputting auditory information, and a haptic module for outputting haptic information.

In addition, the memory 170 can store data that supports various functions of the AI device 100. For example, the memory 170 can store input data acquired by the input unit 120, learning data, a learning model, a learning history, and the like.

Also, the processor 180 can determine at least one executable operation of the AI device 100 based on information determined or generated by using a data analysis algorithm or a machine learning algorithm. The processor 180 can control the components of the AI device 100 to execute the determined operation and request, search, receive, or utilize data of the learning processor 130 or the memory 170. The processor 180 controls the components of the AI device 100 to execute the predicted operation or the operation determined to be desirable among the at least one executable operation.

If the connection of an external device is required to perform the determined operation, the processor 180 can generate a control signal for controlling the external device and may transmit the generated control signal to the external device. The processor 180 can also acquire intention information for the user input and may determine the user's requirements based on the acquired intention information.

Further, the processor 180 can acquire the intention information corresponding to the user input by using at least one of a speech to text (STT) engine for converting speech input into a text string or a natural language processing (NLP) engine for acquiring intention information of a natural language. At least one of the STT engine or the NLP engine is configured as an artificial neural network, at least part of which is learned according to the machine learning algorithm. At least one of the STT engine or the NLP engine can also be learned by the learning processor 130, be learned by the learning processor 240 of the AI server 200, or be learned by their distributed processing.

The processor 180 can also collect history information including the operation contents of the AI device 100 or the user's feedback on the operation and store the collected history information in the memory 170 or the learning processor 130 or transmit the collected history information to the external device such as the AI server 200. The collected history information can thus be used to update the learning model.

Further, the processor 180 can control at least part of the components of AI device 100 so as to drive an application program stored in memory 170. Furthermore, the processor 180 can operate two or more of the components included in the AI device 100 in combination so as to drive the application program.

Figure 2:
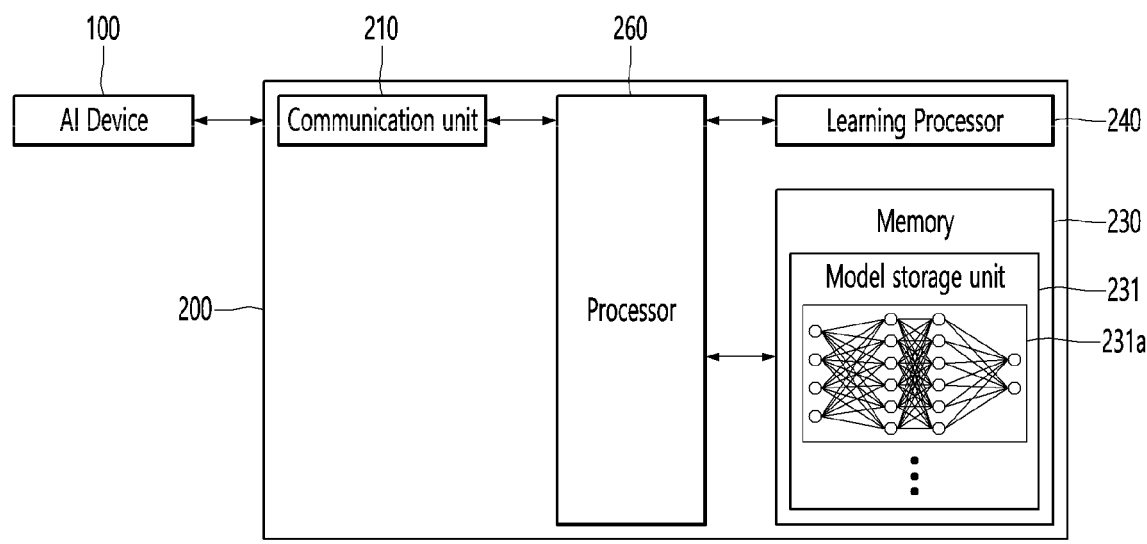
FIG. 2 is a block diagram illustrating an AI server according to an embodiment of the present disclosure.

Next, FIG. 2 is a block diagram illustrating an AI server 200 according to an embodiment of the present disclosure. Referring to FIG. 2, the AI server 200 refers to a device that learns an artificial neural network by using a machine learning algorithm or uses a learned artificial neural network. The AI server 200 may include a plurality of servers to perform distributed processing, or may be defined as a 5G network. Also, the AI server 200 may be included as a partial configuration of the AI device 100, and can perform at least part of the AI processing together.

As shown in FIG. 2, the AI server 200 includes a communication unit 210, a memory 230, a learning processor 240, a processor 260, and the like. The communication unit 210 can transmit and receive data to and from an external device such as the AI device 100, and the memory 230 includes a model storage unit 231. Further, the model storage unit 231 can store a learning or learned model (or an artificial neural network 231a) through the learning processor 240.

Also, the learning processor 240 can learn the artificial neural network 231a by using the learning data. The learning model can be used while mounted on the AI server 200 of the artificial neural network, or can be used while mounted on an external device such as the AI device 100.

The learning model can also be implemented in hardware, software, or a combination of hardware and software. If all or part of the learning models is implemented in software, one or more instructions that constitute the learning model can be stored in memory 230. The processor 260 can thus infer the result value for new input data by using the learning model and generate a response or a control command based on the inferred result value.

Figure 3:
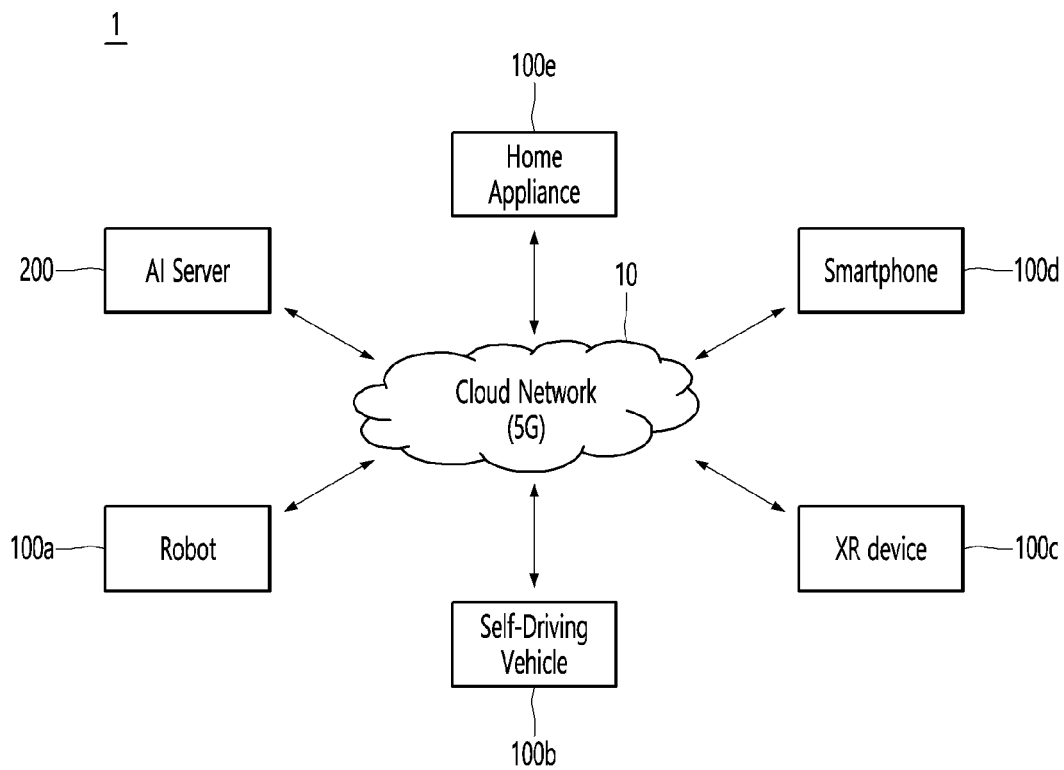
FIG. 3 is an overview illustrating an AI system according to an embodiment of the present disclosure.

Next, FIG. 3 is an overview illustrating an AI system 1 according to an embodiment of the present disclosure. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

The cloud network 10 refers to a network that forms part of a cloud computing infrastructure or exists in a cloud computing infrastructure. The cloud network 10 can be configured by using a 3G network, a 4G or LTE network, or a 5G network. In other words, the devices 100a to 100e and 200 configuring the AI system 1 can be connected to each other through the cloud network 10. Further, each of the devices 100a to 100e and 200 can communicate with each other through a base station, but may directly communicate with each other without using a base station.

The AI server 200 corresponds to a server that performs AI processing and a server that performs operations on a large amount of data. The AI server 200 can be connected to at least one of the AI devices constituting the AI system 1 including the robot 100a, the self-driving vehicle 100b, the XR device 100c, the smartphone 100d, or the home appliance 100e through the cloud network 10, and can assist with at least part of AI processing of the connected AI devices 100a to 100e.

Further, the AI server 200 can learn the artificial neural network according to the machine learning algorithm instead of the AI devices 100a to 100e, and directly store the learning model or transmit the learning model to the AI devices 100a to 100e. The AI server 200 can also receive input data from the AI devices 100a to 100e, infer the result value for the received input data by using the learning model, generate a response or a control command based on the inferred result value, and transmit the response or the control command to the AI devices 100a to 100e. Alternatively, the AI devices 100a to 100e can infer the result value for the input data by directly using the learning model, and generate the response or the control command based on the inference result.

Hereinafter, various embodiments of the AI devices 100a to 100e to which the above-described technology is applied will be described. The AI devices 100a to 100e illustrated in FIG. 3 can be regarded as a specific embodiment of the AI device 100 illustrated in FIG. 1.

<AI+Robot>

The robot 100a, to which the AI technology is applied, can be implemented as a guide robot, a carrying robot, a cleaning robot, a wearable robot, an entertainment robot, a pet robot, an unmanned flying robot, or the like. The robot 100a includes a robot control module for controlling the operation, and the robot control module refers to a software module or a chip implementing the software module by hardware.

The robot 100a can acquire state information about the robot 100a by using sensor information acquired from various kinds of sensors, detect (recognize) surrounding environment and objects, generate map data, determine the path and the travel plan, may determine the response to user interaction, or determine the operation.

The robot 100a can use the sensor information acquired from at least one sensor among the lidar, the radar, and the camera so as to determine the travel path and the travel plan. The robot 100a can also perform the above-described operations by using the learning model composed of at least one artificial neural network. For example, the robot 100a can recognize the surrounding environment and the objects by using the learning model, and determine the operation by using the recognized surrounding information or object information. The learning model can be learned directly from the robot 100a or may be learned from an external device such as the AI server 200.

In addition, the robot 100a can perform the operation by generating the result by directly using the learning model, but the sensor information can be transmitted to the external device such as the AI server 200 and the generated result can be received to perform the operation. The robot 100a can use at least one of the map data, the object information detected from the sensor information, or the object information acquired from the external device to determine the travel path and the travel plan, and control the driving unit such that the robot 100a travels along the determined travel path and travel plan.

Further, the map data can include object identification information about various objects arranged in the space in which the robot 100a moves. For example, the map data can include object identification information about fixed objects such as walls and doors and movable objects such as pollen and desks. The object identification information can also include a name, a type, a distance, and a position.

In addition, the robot 100a can perform the operation or travel by controlling the driving unit based on the control/interaction of the user. The robot 100a can also acquire the intention information of the interaction due to the user's operation or speech utterance, and determine the response based on the acquired intention information, and may perform the operation.

<AI+Self-Driving>

The self-driving vehicle 100b, to which the AI technology is applied, can be implemented as a mobile robot, a vehicle, an unmanned flying vehicle, or the like. The self-driving vehicle 100b can include a self-driving control module for controlling a self-driving function, and the self-driving control module refers to a software module or a chip implementing the software module by hardware. The self-driving control module can be included in the self-driving vehicle 100b as a component thereof, but can be implemented with separate hardware and connected to the outside of the self-driving vehicle 100b.

In addition, the self-driving vehicle 100b can acquire state information about the self-driving vehicle 100b by using sensor information acquired from various kinds of sensors, detect (recognize) surrounding environment and objects, generate map data, determine the path and the travel plan, or determine the operation.

Like the robot 100a, the self-driving vehicle 100b can use the sensor information acquired from at least one sensor among the lidar, the radar, and the camera so as to determine the travel path and the travel plan. In particular, the self-driving vehicle 100b can recognize the environment or objects for an area covered by a field of view or an area over a certain distance by receiving the sensor information from external devices, or receive directly recognized information from the external devices.

Further, the self-driving vehicle 100b can perform the above-described operations by using the learning model composed of at least one artificial neural network. For example, the self-driving vehicle 100b can recognize the surrounding environment and the objects using the learning model, and determine the traveling movement line using the recognized surrounding information or object information. The learning model can be learned directly from the self-driving vehicle 100a or learned from an external device such as the AI server 200.

Also, the self-driving vehicle 100b can perform the operation by generating the result by directly using the learning model, but the sensor information can be transmitted to the external device such as the AI server 200 and the generated result can be received to perform the operation. The self-driving vehicle 100b can use at least one of the map data, the object information detected from the sensor information, or the object information acquired from the external device to determine the travel path and the travel plan, and control the driving unit such that the self-driving vehicle 100b travels along the determined travel path and travel plan.

The map data can include object identification information about various objects arranged in the space (for example, road) in which the self-driving vehicle 100b travels. For example, the map data can include object identification information about fixed objects such as street lamps, rocks, and buildings and movable objects such as vehicles and pedestrians. The object identification information can include a name, a type, a distance, and a position.

In addition, the self-driving vehicle 100b can perform the operation or travel by controlling the driving unit based on the control/interaction of the user. The self-driving vehicle 100b can also acquire the intention information of the interaction due to the user's operation or speech utterance, and determine the response based on the acquired intention information, and may perform the operation.

<AI+XR>

The XR device 100c, to which the AI technology is applied, can be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c can analyzes three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

The XR device 100c can perform the above-described operations using the learning model composed of at least one artificial neural network. For example, the XR device 100c can recognize the real object from the three-dimensional point cloud data or the image data using the learning model, and provide information corresponding to the recognized real object. The learning model can be directly learned from the XR device 100c, or be learned from the external device such as the AI server 200.

In addition, the XR device 100c can perform the operation by generating the result by directly using the learning model, but the sensor information can be transmitted to the external device such as the AI server 200 and the generated result can be received to perform the operation.

<AI+Robot+Self-Driving>

The robot 100a, to which the AI technology and the self-driving technology are applied, can be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b. The robot 100a having the self-driving function can collectively refer to a device that moves for itself along the given movement line without the user's control or moves for itself by determining the movement line by itself.

Also, the robot 100a and the self-driving vehicle 100b having the self-driving function can use a common sensing method so as to determine at least one of the travel path or the travel plan. For example, the robot 100a and the self-driving vehicle 100b having the self-driving function can determine at least one of the travel path or the travel plan by using the information sensed through the lidar, the radar, and the camera.

The robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. In this instance, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, if it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a can include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, can be implemented as a guide robot, a carrying robot, a cleaning robot, a wearable robot, an entertainment robot, a pet robot, an unmanned flying robot, a drone, or the like. The robot 100a, to which the XR technology is applied, refers to a robot subjected to control/interaction in an XR image. The robot 100a can also be separated from the XR device 100c and interwork with XR device 100c.

If the robot 100a, which is subjected to control/interaction in the XR image, can acquire the sensor information from the sensors including the camera, the robot 100a or the XR device 100c can generate the XR image based on the sensor information, and the XR device 100c can output the generated XR image. The robot 100a can operate based on the control signal input through the XR device 100c or the user's interaction. For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, can be implemented as a mobile robot, a vehicle, an unmanned flying vehicle, or the like. The self-driving vehicle 100b, to which the XR technology is applied, refers to a self-driving vehicle having a means for providing an XR image or a self-driving vehicle subjected to control/interaction in an XR image. Particularly, the self-driving vehicle 100b subjected to control/interaction in the XR image can be distinguished from the XR device 100c and interwork with each other.

The self-driving vehicle 100b providing the XR image can acquire the sensor information from the sensors including the camera and output the generated XR image based on the acquired sensor information. For example, the self-driving vehicle 100b can include an HUD to output an XR image, thereby providing a passenger with a real object or an XR object corresponding to an object in the screen.

In addition, if the XR object is output to the HUD, at least part of the XR object can be output so as to overlap the actual object to which the passenger's gaze is directed. If the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

If the self-driving vehicle 100b, which is subjected to control/interaction in the XR image, can acquire the sensor information from the sensors including the camera, the self-driving vehicle 100b or the XR device 100c can generate the XR image based on the sensor information, and the XR device 100c can output the generated XR image. The self-driving vehicle 100b can operate based on the control signal input through the external device such as the XR device 100c or the user's interaction.

Figure 4:
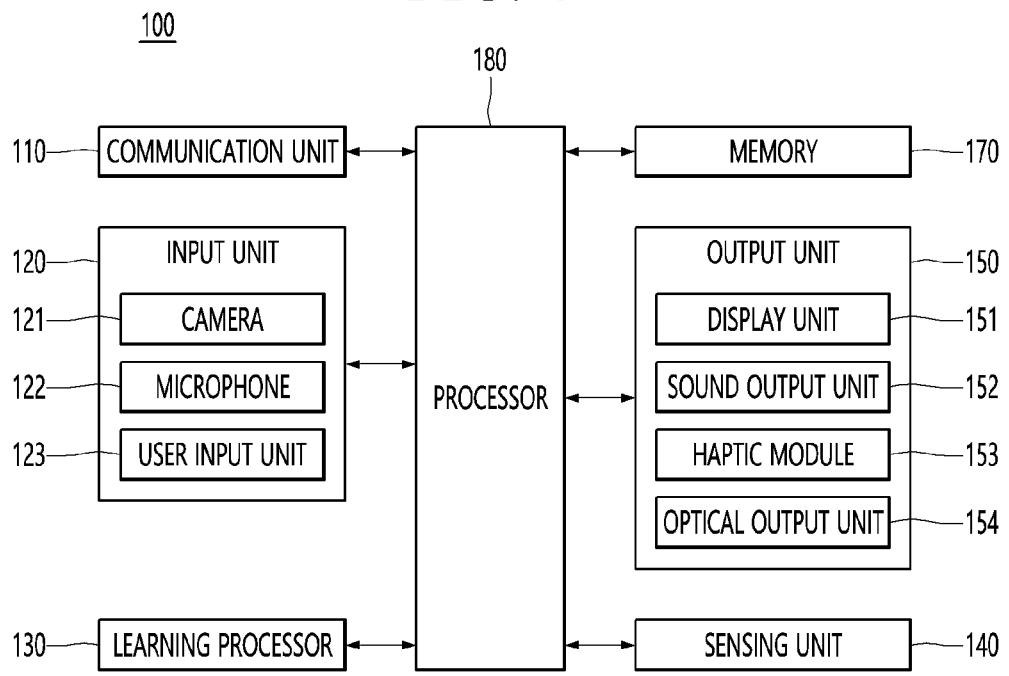
FIG. 4 is a block diagram illustrating an AI device according to an embodiment of the present disclosure.

Next, FIG. 4 illustrates an AI device 100 according to an embodiment of the present disclosure. A redundant repeat of FIG. 1 will be omitted below. Referring to FIG. 4, the input unit 120 includes a camera 121 for image signal input, a microphone 122 for receiving audio signal input, and a user input unit 123 for receiving information from a user.

Voice data or image data collected by the input unit 120 are analyzed and processed as a user's control command. Then, the input unit 120 is used for inputting image information (or signal), audio information (or signal), data, or information inputted from a user and the mobile terminal 100 can include at least one camera 121 in order for inputting image information.

The camera 121 processes image frames such as a still image or a video acquired by an image sensor in a video call mode or a capturing mode. The processed image frame can be displayed on the display unit 151 or stored in the memory 170. Further, the microphone 122 processes external sound signals as electrical voice data. The processed voice data can also be utilized variously according to a function (or an application program being executed) being performed in the mobile terminal 100. Moreover, various noise canceling algorithms for removing noise occurring during the reception of external sound signals can be implemented in the microphone 122.

The user input unit 123 is to receive information from a user and if information is input through the user input unit 123, the processor 180 can control an operation of the mobile terminal 100 to correspond to the input information. The user input unit 123 can include a mechanical input mechanism (or a mechanical key, for example, a button, a dome switch, a jog wheel, and a jog switch at the front, back or side of the mobile terminal 100) and a touch type input mechanism. As one example, a touch type input mechanism can include a virtual key, a soft key, or a visual key, which is displayed on a touch screen through software processing or can include a touch key disposed at a portion other than the touch screen.

As shown, the output unit 150 includes at least one of a display unit 151, a sound output module 152, a haptic module 153, or an optical output module 154. The display unit 151 can display (output) information processed in the mobile terminal 100. For example, the display unit 151 can display execution screen information of an application program running on the mobile terminal 100 or user interface (UI) and graphic user interface (GUI) information according to such execution screen information.

The display unit 151 can be formed with a mutual layer structure with a touch sensor or formed integrally, so that a touch screen can be implemented. Such a touch screen can serve as the user input unit 123 providing an input interface between the mobile terminal 100 and a user, and an output interface between the mobile terminal 100 and a user at the same time.

Also, the sound output module 152 can output audio data received from the wireless communication unit 110 or stored in the memory 170 in a call signal reception or call mode, a recording mode, a voice recognition mode, or a broadcast reception mode. The sound output module 152 can include a receiver, a speaker, and a buzzer. In addition, the haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

Figure 5:
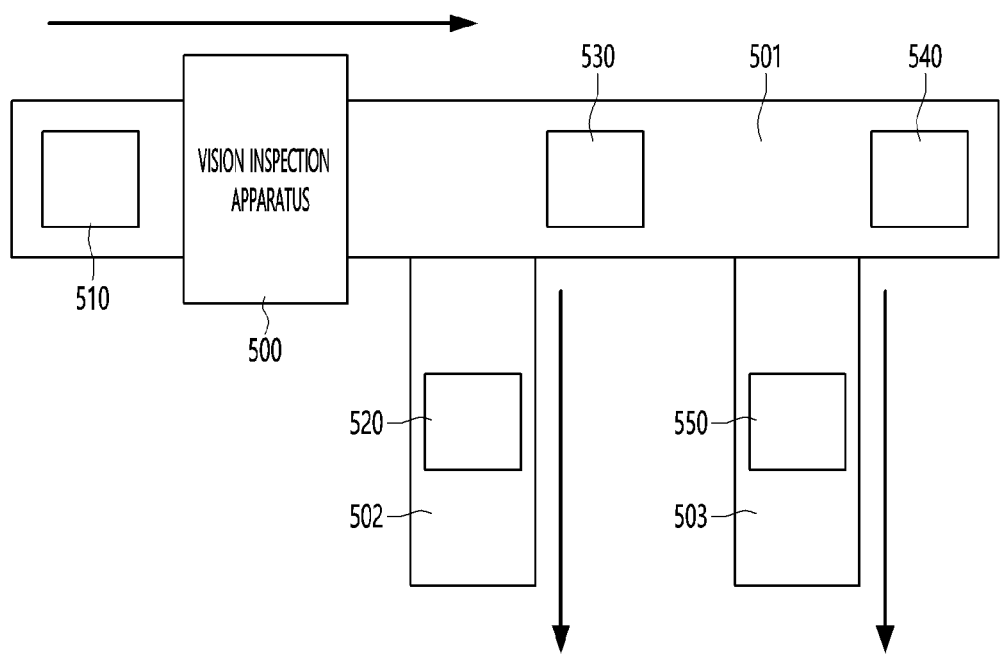
FIG. 5 is an external view illustrating a production process in which a vision inspection apparatus performs a vision inspection according to an embodiment of the present disclosure.

Next, FIG. 5 is an external view illustrating a production process in which a vision inspection apparatus 500 performs a vision inspection according to an embodiment of the present disclosure. Referring to FIG. 5, in a product production process, a plurality of products (e.g., 510, 520, 530, 540, 550, etc.) can be sequentially transported to a next process through a transport mechanism such as conveyor belts 501, 502, and 503.

The vision inspection apparatus 500 can be equipped with an artificial intelligence device trained through deep learning and determine whether a specific product (e.g., 510) is a good product or a defective product. When the specific product 510 passes through the vision inspection apparatus 500 and is determined as a good product without defects as a result of the inspection of the vision inspection apparatus 500, the specific product 510 can be transported to the first conveyor belt 502 or the second conveyor belt 503.

When the specific product 510 passes through the vision inspection apparatus 500 and is determined as a defective product as a result of the inspection of the vision inspection apparatus 500, the specific product 510 can be transported to the third conveyor belt 501. Therefore, as shown in FIG. 5, the products 520 and 550 among the plurality of products can be products determined as good products without defects, and the products 530 and 540 among the plurality of products can be products determined as defective products from which defects are detected.

Also, according to an embodiment of the present disclosure, the vision inspection apparatus 500 uses deep learning, and thus includes an AI model. For example, the vision inspection apparatus 500 can include the configuration of the AI device 100 described with reference to FIGS. 1 to 4.

According to an embodiment of the present disclosure, the image processing apparatus 100 of the present disclosure can be used to generate training data for training the deep learning model of the vision inspection apparatus 500. According to an embodiment of the present disclosure, the image processing apparatus 100 can be used interchangeably with the AI device 100 or the terminal 100, which is the configuration described with reference to FIGS. 1 to 4, and includes all configurations of the AI devices 100 of FIGS. 1 to 4.

Figure 6:
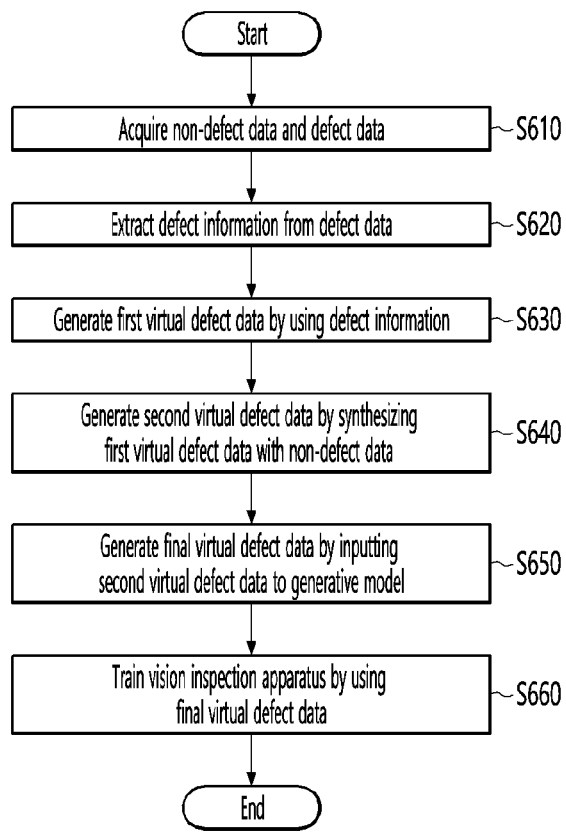
FIG. 6 is a flowchart illustrating a process of generating virtual defect data according to an embodiment of the present disclosure.

Hereinafter, the image processing apparatus 100 will be described with reference to FIG. 6. In particular, FIG. 6 is a flowchart illustrating a process of generating virtual defect data according to an embodiment of the present disclosure.

According to an embodiment of the present disclosure, the image processing apparatus 100 can acquire at least one non-defect data and at least one defect data by using a data acquisition unit (S610). The data acquisition unit of the image processing apparatus 100 can include the camera 121 of the input unit 120, the communication unit 110 that communicates with the external device or the server 200, and the memory 170 that reads stored data.

When the data acquisition unit is the camera 121, data can be acquired by directly photographing the non-defect data and the defect data. When the data acquisition unit is the communication unit 110, the non-defect data and the defect data can be data received from the external device or the server 200.

When the data acquisition unit is the memory 170, the non-defect data and the defect data can be data stored in the image processing apparatus 100. The non-defect data can include an image of a product classified as a normal product through a vision inspection or other inspection during the production process. The defect data can include an image of a product being scanned and having a defect. That is, the non-defect data and the defect data can include images obtained by photographing the product during the actual production process. The defect refers to a scratch, separation, breakage, or other deviation from predetermined specifications on the surface or the inside of the product.

The processor 180 of the image processing apparatus 100 can extract defect information from the defect data acquired through the data acquisition unit (S620). The defect information can include at least one of the regions, locations, sizes, shapes, and the number of defects. Specifically, the processor 180 can extract the region of the defect included in the defect data by using an image processing algorithm. For example, the region of the defect can be extracted by masking a specific region where the defect is detected from the defect data.

In addition, the processor 180 can extract the location, the size, and the shape of the defect through a relationship with neighboring pixels or a method of when the difference with comparison data exceeds a predetermined value during masking by using the image processing algorithm. The processor 180 can mask the region where the defect is detected and can generate a mask image obtained by extracting the masked region. The mask image has the same size as the defect data and can include a binary image in which defects extracted from the defect data are indicated. For example, a pixel representing a defect in the mask image can be set to a maximum brightness (e.g., 255) and the other portions can be set to a minimum brightness (e.g., 0).

The processor 180 can store the non-defect data, the defect data, and the mask image in the memory 170. According to an embodiment of the present disclosure, the processor 180 can perform a first operation of generating first virtual defect data by using the defect information (S630). In this instance, the first operation can include an image manipulation process. The first virtual defect data generated according to the first operation is not an image obtained by photographing an actual defective product, but is a virtual defective product image generated based on the defect data.

Figure 7:
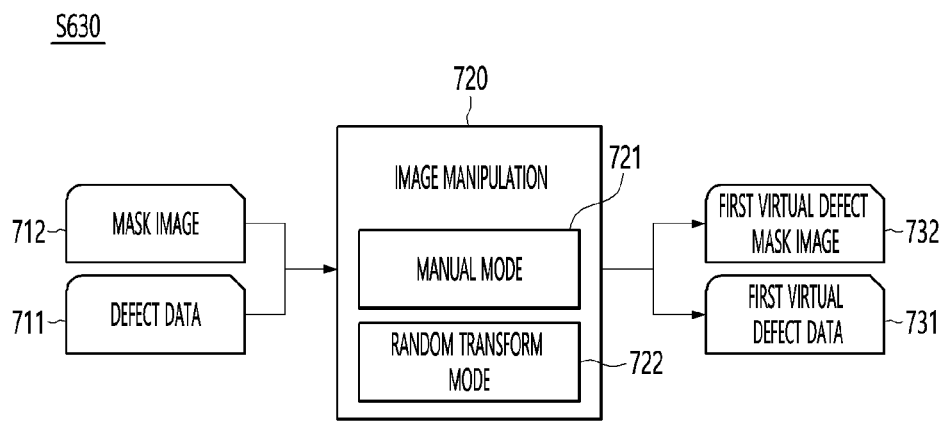
FIG. 7 is a view illustrating a process of generating first virtual defect data according to an embodiment of the present disclosure.

A specific example related to the first operation will be described with reference to FIG. 7. In particular, FIG. 7 is a view illustrating a process of generating first virtual defect data according to an embodiment of the present disclosure. Referring to FIG. 7, the processor 180 can generate first virtual defect data 731 through a first operation 720 based on defect data 711 and a mask image 712. In more detail, the processor 180 can generate the first virtual defect data 731 by setting at least one of the locations, the sizes, the shapes, and the number of defects included in defect information.

The first operation 720 is a method of generating the first virtual defect data, and can include a manual mode 721 for generating the first virtual defect data 731 according to a predetermined pattern and a random transform mode 722 for generating the first virtual defect data 731 by setting arbitrary parameters. According to an embodiment, in the manual mode 721, the processor 180 can receive pieces of information included in the defect information from the user input unit. The defect information received from the user input unit can include at least one of the regions, the sizes, the locations, and the number of defects. The processor 180 can generate the first virtual defect data 731 based on the received defect information.

Alternatively, the processor 180 can generate the first virtual defect data 731 according to the regions, the sizes, the locations, and the number of the received defects by using a predetermined function or pattern. The predetermined function or pattern can be variously set according to the type of product, the pixel value distribution of defect data, the shape of the product, specifications, requirements, design, and the like. For example, when a first image having the same resolution as the defect data exists and defect information corresponding to a first location by a first pixel is input to a first region through the user input unit, the processor 180 can generate a defect having a size of the first pixel at a first location in the first region of the first image.

According to an embodiment, in the random transform mode 722, the processor 180 can generate the first virtual defect data 731 by arbitrarily setting the regions, the sizes, the locations, and the number of the defects. For example, the processor 180 can set the regions, the sizes, the locations, and the number of the defects as arbitrary parameters and can generate the first virtual defect data 731 according to the set parameters.

In addition, the arbitrary parameters can be generated by using a random variable generation algorithm. At least one region of the defect can be set according to the first operation 720, and at least one defect can exist in at least one size and at least one location within the region of the defect.

Further, although the manual mode 721 and the random transform mode 722 have been separately described, it is also possible to generate the first virtual defect data 731 by setting some parameters included in the defect information to the manual mode 721 and some parameters to the random transform mode 722.

After generating the first virtual defect data 731, the processor 180 can mask the first virtual defect data 731 to generate a first virtual defect mask image 732. The first virtual defect mask image 732 can include an image having the same size or resolution as that of the first virtual defect data 731 and representing a defect extracted from the defect data as a binary image.

Returning again to the description in FIG. 6, the processor 180 can perform a second operation of generating second virtual defect data by synthesizing the first virtual defect data with the non-defect data (S640). In more detail, the second virtual defect data refers to an image in which the first virtual defect data, the non-defect data, and the first virtual mask image are synthesized and blended to generate more natural virtual defect data.

Hereinafter, the second operation will be described with reference to FIG. 8. In particular, FIG. 8 is a view illustrating a process of generating second virtual defect data according to an embodiment of the present disclosure.

Figure 8:
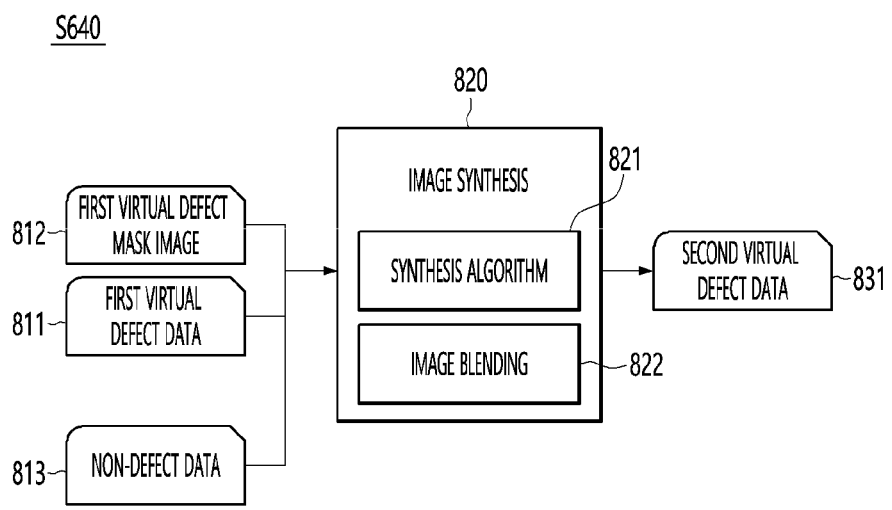
FIG. 8 is a view illustrating a process of generating second virtual defect data according to an embodiment of the present disclosure.

Referring to FIG. 8, the processor 180 can generate second virtual defect data 831 by synthesizing first virtual defect data 811 with non-defect data 813 in a second operation 820. In more detail, the processor 180 can generate a synthesized image by inputting the first virtual defect data 811, the non-defect data 813, and a first virtual defect mask image 812 to a synthesis algorithm 821.

The processor 180 can generate second virtual defect data by performing image blending 822 on the synthesized image. More specifically, in accordance with the synthesis algorithm 821, the processor 180 can generate a first synthesized image by synthesizing a defect included in a defect region of the first virtual defect mask image 812 with the non-defective data 813, and can generate a second synthesized image by synthesizing a portion other than the defect included in the defect region of the first virtual defect mask image 812 with the first virtual defect data 811.

In addition, the processor 180 can generate the second virtual defect data 831 by synthesizing the first synthesized image with the second synthesized image and performing image blending in order to naturally process a boundary of the synthesized image. The blending refers to an operation of smoothing a boundary such as an artifact of a synthesized image based on values of neighboring pixels. As the blending algorithm, multi-band blending, Laplacian blending, Poisson blending, and the like can be used. The processor 180 can also acquire the second virtual defect data 831 closer to the actual defect data by blending the synthesized image.

Further, the above-described synthesis refers to a pixel product of images used in image processing, and includes generating a single image by reflecting the features of images synthesized according to various pixel processing methods used in image processing, such as image interpolation, transformation algorithm, and the like.

Next, FIG. 6 is described again. After generating the second virtual defect data 831, the processor 180 can perform a third operation of generating final virtual defect data by inputting the second virtual defect data 831 to an artificial intelligence model (S650). Specifically, the third operation refers to performing image harmonization on the second virtual defect data 831 by using the artificial intelligence model and generating final virtual defect data 934. The final virtual defect data refers to an image in which an artifact boundary is naturally processed rather than the second virtual defect data.

Figure 9:
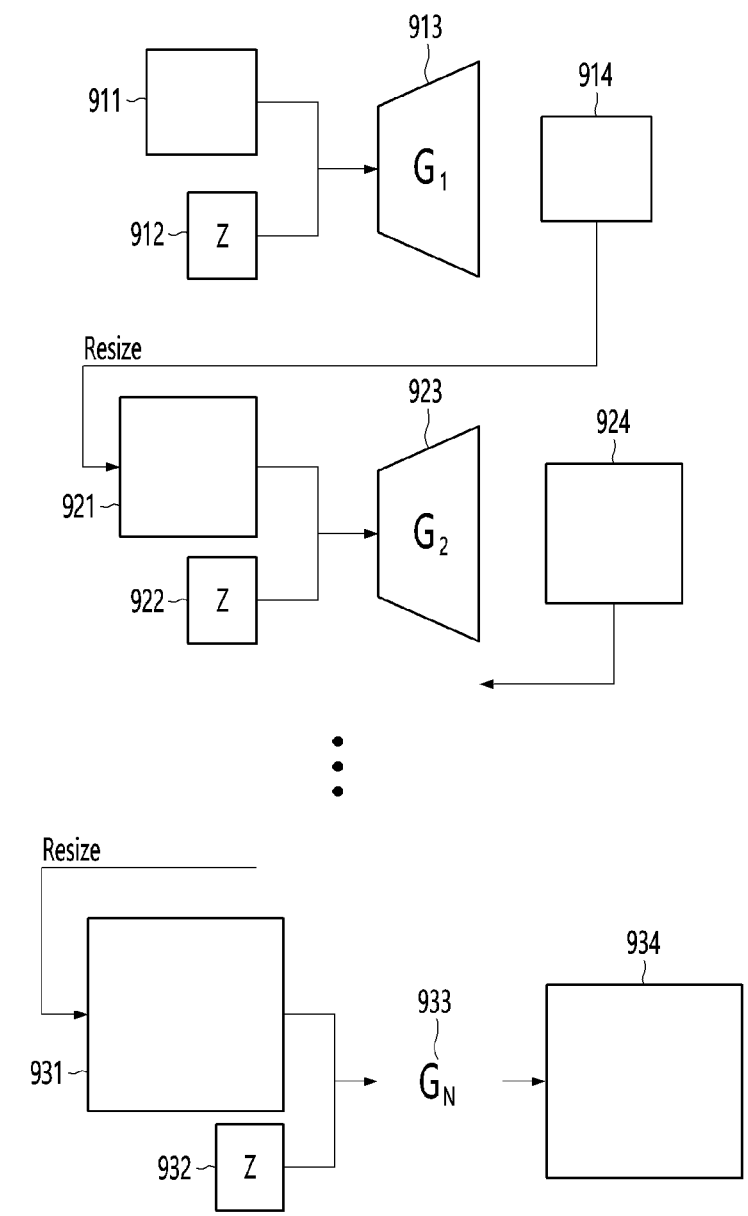
FIG. 9 is a flow diagram illustrating a process of generating final virtual defect data according to an embodiment of the present disclosure.

A detailed description of the third operation will be described with reference to FIG. 9. In particular, FIG. 9 is a flow diagram illustrating a process of generating final virtual defect data according to an embodiment of the present disclosure. An artificial intelligence model according to an embodiment of the present disclosure can include a Generative Adversarial Network (GAN) model including a generative model and a discriminative model.

The generative model (e.g., 913, 923, or 933) can include a model for generating final virtual defect data 934 based on non-defect data, defect data, and defect information. The discriminative model can include a model for determining whether an input image is actual data or virtual defect data.

The discriminative model will be described in detail with reference to FIGS. 10 and 11. In addition, the training method of the GAN model will be described in detail with reference to FIGS. 10 and 11, and a process of generating final virtual defect data according to the use of the generative model will be described with reference to FIG. 9.

Referring to FIG. 9, according to an embodiment, when image harmonization is performed, the GAN model can include a GAN model of a single stage or a plurality of stages. Specifically, according to an embodiment of the present disclosure, during image harmonization, the GAN model can include GAN models (e.g., 913, 923, 933, etc.) of a plurality of stages.

Each of the plurality of stages can include a generative model trained to output an image having higher quality than that of the second virtual defect data when an image based on the second virtual defect data 911, 921, and 931 is input. The image having higher quality refers to an image having a high similarity to defect data obtained in an actual process by blending the boundaries and artifacts of the image.

Specifically, the plurality of stages included in the GAN model can be connected to each other, and a scale factor (S) for input from each stage to the next stage can exist. The scale factor (S) refers to a parameter for adjusting a size of an input image when moving from a previous stage to a next stage whenever an image passes through a plurality of stages.

For example, the first image input in the first stage can be converted into high quality according to the output result of the generative model of the first stage, and the first image converted into high quality can be transformed into a second image, whose size or resolution is increased by a scale factor, in order to be input to the generative model of the second stage, which is the next stage. Specifically, the transform can include scaling. That is, the first image can be an image in which horizontal and vertical widths are scaled by the scale factor than that of the second image.

According to an embodiment of the present disclosure, an image finally generated by passing through all of the plurality of stages can be final virtual defect data. The size of the final virtual defect data that has passed through the plurality of stages can be the same as that of the second virtual defect data.

In order to adjust the size of the final virtual defect data, it is preferable that the processor 180 performs the operation S650 after scaling to reduce the second virtual defect data by 'the number of stages (N)−1' times. That is, according to an embodiment, the processor 180 can control a similarity to the pattern of the defect data trained by the generative model by adjusting the number of a plurality of stages or setting a stage to which the second virtual defect data is first input among the plurality of stages.

In other words, the number of the plurality of stages can include a degree of image harmonization. According to a specific embodiment, as the second virtual defect data 911 is input in a lower stage among the plurality of stages, a defect region generated from the final virtual defect data can appear more similar to a pattern trained from a training data set of the generative model. When the second virtual defect data is first input in a higher stage among the plurality of stages, a defect region generated from the final virtual defect data can appear less similar to a pattern trained from a training data set of the generative model.

Accordingly, it is preferable for the user to design the starting stage among the plurality of stages or the number of the plurality of stages by comprehensively considering the cost, time, performance, and the like for using the image processing apparatus.

Hereinafter, a method of acquiring the final virtual defect data in FIG. 9 according to a specific example is as follows. According to an embodiment of the present disclosure, after generating the second virtual defect data 911, the processor 180 can generate the first final virtual defect data 914 by inputting the second virtual defect data 911 to the first generative model 913.

The first final virtual defect data 914 can be an image blended with respect to the second virtual defect data 911. Since the first final virtual defect data 914 is blended with respect to the second virtual defect data 911, the final virtual defect data can have a high quality similar to that of the actual defect data.

The processor 180 can increase the size of the first final virtual defect data 914 by the scale factor S, and can input the scaled first final virtual defect data 914 to the second generative model 923. The second generative model 923 can generate second final virtual defect data 924 that is blended with respect to the first final virtual defect data 914.

According to an embodiment of the present disclosure, the above process can be repeatedly performed every N stages. The processor 180 can generate the final virtual defect data 934 by inputting the scaled Nth final virtual defect data 931 to an Nth generative model 933 in an Nth stage.

According to the present disclosure, since the second virtual defect data is scaled by N times the scale factor (S) and input to the first stage, the finally obtained final virtual defect data 934 can have the same size as that of the non-defect data, the first virtual defect data, and the second virtual defect data. Since the generative model is a pre-trained model to output images similar to actual defect data, the final virtual defect data generated by the above process can have a higher similarity to the defect data than the second virtual defect data.

According to an embodiment of the present disclosure, it is also possible to use the GAN model of the single stage during image harmonization. Specifically, the GAN model of the single stage refers to a model in which N is 1 in a GAN model having N stages.

For example, when an image based on the second virtual defect data is input to the generative model in a single stage, the final virtual defect data having a higher quality than the second virtual defect data can be output. Further, the image having higher quality refers to an image having a high similarity to defect data obtained in an actual process by blending the boundaries and artifacts of the image.

Although the GAN model of the single stage and the GAN model of multiple stages have been described in the embodiment of the present disclosure, the GAN model of multiple stages can produce higher quality images than the single stage. Therefore, when generating the final virtual defect data, it is preferable to use the GAN model of multiple stages. In addition, referring to FIG. 9, it is also possible for noise (z, 912, 922, 932) to be synthesized with the input value of each stage and used as the input value of the generative model.

FIG. 6 is described again. The processor 180 can train the vision inspection apparatus 500 by using the final virtual defect data (S660). The final virtual defect data refers to virtually generated defect data.

Specifically, when the image processing apparatus 100 according to an embodiment of the present disclosure generates the final virtual defect data, the processor 180 can train the vision inspection apparatus 500 by using the final virtual defect data. When an image is input to a deep learning model used for vision inspection, the processor 180 of the image processing apparatus 100 can support the training of the deep learning model for determining whether the image is non-defective data or defective data. For example, the final virtual defect data can be used as image data input during training.

According to an embodiment of the present disclosure, the deep learning model of the vision inspection apparatus 500 can be trained by using data provided from the external device or the server 200. Alternatively, the vision inspection apparatus 500 can receive training data including the final virtual defect data and train the deep learning model through the operation of the processor of the vision inspection apparatus. The vision inspection apparatus 500 including the trained deep learning model can determine whether a product is good or defective during the production process.

Figure 10:
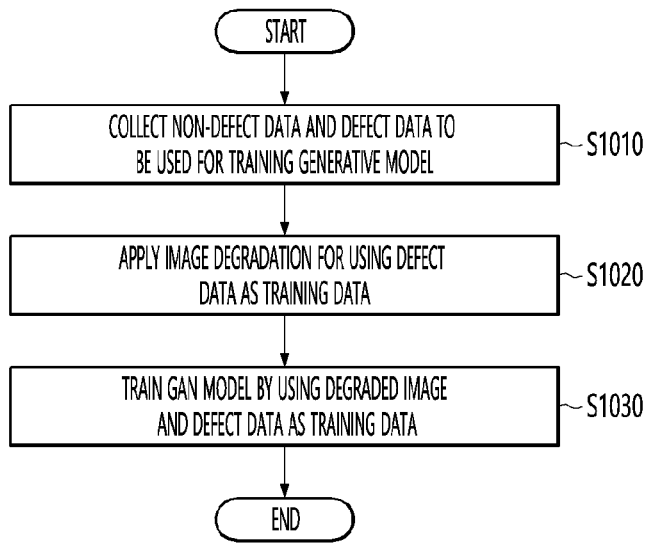
FIG. 10 is a flowchart illustrating a process of training an AI model according to an embodiment of the present disclosure.

Next, FIG. 10 is a flowchart illustrating a process of training an AI model according to an embodiment of the present disclosure. According to an embodiment of the present disclosure, the processor 180 of the image processing apparatus 100 can collect training non-defect data and training defect data to be used for training the generative model during training (S1010).

The training non-defect data and the training defect data can include image data obtained in the actual process, and be image data generated from the external device for artificially training the AI model of the image processing apparatus. The processor 180 causes image degradation with respect to the training defect data according to a predetermined pattern or an arbitrary pattern (S1020) and trains the GAN model by using the degraded training defect data (S1030).

Hereinafter, a detailed training process of the GAN model will be described with reference to FIG. 11. In particular, FIG. 11 is a view illustrating a training process of an AI model according to an embodiment of the present disclosure. The AI model of the present disclosure can include a GAN model, and the GAN model can include a generative model 1100 and a discriminative model 1200.

Further, the generative model 1100 refers to a model trained to generate an output image from an input image, and the discriminative model 1200 refers to a model trained to output information about whether an output image is authentic. Specifically, each of the generative model 1100 and the discriminative model 1200 can be configured with the above-described neural network, but is not limited thereto.

Further, the generative model 1100 according to an embodiment can be complementarily trained by using the discriminative model 1200. The processor 180 can also generate virtual defect data based on the trained database when defect data is input by using the trained generative model 1100.

Figure 11:
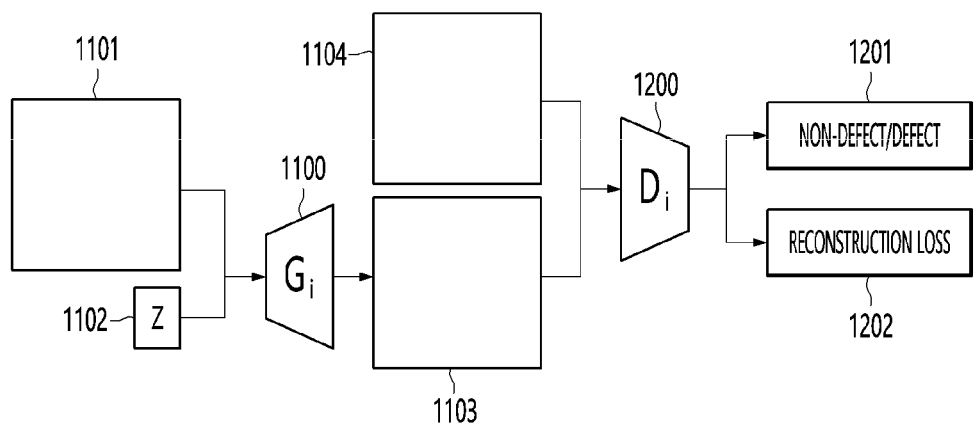
FIG. 11 is a view for describing a process of training an AI model, according to an embodiment of the present disclosure.

Referring to FIG. 11, the generative model 1100 can be a neural network trained by a plurality of training data so as to generate final virtual defect data 1103 when degraded defect data 1101 and noise (z, 1102) are input. According to an embodiment, the generative model 1100 and the discriminative model 1200 can be trained by using, as training data, at least one or a combination of the deteriorated defect data 1101, the defect data 1104, the final virtual defect data 1103, and the authenticity result value 1201 and reconstruction loss 1202 of the discriminative model 1200.

The output of the discriminative model 1200 can include the authenticity 1202. In this instance, the authenticity information can be non-defect data or defect data. For example, the authenticity information is a probability indicating whether the image represents a real object, and can indicate that 0 is virtual data and 1 is actual data.

The discriminative model 1200 can be trained so as to be classified as an actual image by a target ratio when determining whether the generated image is actual image data (i.e., authenticity). For example, the discriminative model 1200 can be trained until the ratio of correct answers of the actual authenticity result value 1201 converges to a specific value. The training of the discriminative model 1200 can be terminated when the ratio at which the authenticity result value 1201 appears as a correct answer converges to the target ratio.

In the training process, a reconstruction loss 1202 can be used to train the generative model 1100 and the discriminative model 1200. The reconstruction loss 1202 can represent an error between the output image generated from the input image by the generative model 1100 and a correct answer image for the input image.

The correct answer image can be the defect data image 1104 before the input image is degraded. In addition, the processor 180 can update the parameters of the generative model 1100 such that the reconstruction loss 1202 is minimized. In addition, the processor 180 can update the parameter of the generative model 320 until an error regarding the authenticity 1202 converges to a predetermined value.

According to an embodiment of the present disclosure, the training of a plurality of GAN models can be performed as separate training for each stage. For example, when the scale factor is S and the highest resolution for training a GAN model in a specific stage (I) among a plurality of stages is width (W)×height (H), the processor can use an image having a resolution reduced by 'N−1' times the scale factor (S) as training data in the N stage.

The generative model 1100 and the discriminative model 1200 can be trained through the training process. After the training is completed, the processor 180 can generate final virtual defect data based on the defect data as shown in FIG. 6. The generated final virtual defect data can be used as training data of the deep learning model of the vision inspection apparatus 500.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the processor 180 of the terminal.

The invention claimed is:

1. A product inspection apparatus comprising:
a camera configured to capture an image of a product to be inspected; and
a processor configured to:
extract defect information from a defect indicated by the captured image of the product,
generate first virtual defect data including at least one of a location, a size and a shape of the defect included in the captured image, based on the extracted defect information,
generate second virtual defect data by synthesizing the first virtual defect data with non-defect data representing the product without the defect and a virtual mask image representing the defect extracted from the first virtual defect data as a binary image, and
generate final virtual defect data by inputting the second virtual defect data to an artificial intelligence generative model.

2. The apparatus of claim 1, wherein the generated first virtual defect data further includes a number of defects indicated by the captured image of the product.

3. The apparatus of claim 1, wherein the artificial intelligence generative model outputs a higher quality second virtual data than the input second virtual defect data by increasing a size or resolution of the input second virtual defect data.

4. The apparatus of claim 3, wherein the processor is further configured to:
blend boundaries and artifacts of the second virtual defect data.

5. The apparatus of claim 1, further comprising:
a user input unit configured to manually input the first virtual defect data.

6. The apparatus of claim 1, wherein the processor is configured to:
generate the first virtual defect data by arbitrarily setting the at least one of the location, the size, and the shape of the defect.

7. The apparatus of claim 1, wherein the artificial intelligence generative model comprises a Generative Adversarial Network (GAN) model including a generative model and a discriminative model, and
wherein the final virtual defect data is blended with respect to the second virtual defect data.

8. The apparatus of claim 7, wherein the artificial intelligence generative model comprises a plurality of stages in which a result value is an input value of a next stage,
wherein the processor is further configured to scale the second virtual defect data based on a number of the plurality of stages, and generate the final virtual defect data by inputting the scaled second virtual defect data to the plurality of stages, and
wherein the final virtual defect data has a higher similarity to the defect than the second virtual defect data.

9. The apparatus of claim 1, wherein the artificial intelligence model comprises a Generative Adversarial Network (GAN) model including a generative model and a discriminative model,
wherein the generative model is configured to generate the final virtual defect data based on the non-defect data and the defect information, and
wherein the discriminative model is configured to determine whether an input image is actual data or virtual defect data.

10. The apparatus of claim 9, wherein the generative model is trained to minimize reconstruction loss of the discriminative model by inputting the defect information and degraded data to the discriminative model.

11. The apparatus of claim 9, wherein the discriminative model is trained to output authenticity information by determining whether the input image is the actual data or the virtual defect data and to minimize an error of the authenticity information.

12. A product inspection method comprising:
capturing, via a camera, an image of a product to be inspected;
extracting, via a processor, defect information from a defect indicated by the captured image of the product;
generating, via the processor, first virtual defect data including at least one of a location, a size and a shape of the defect included in the captured image, based on the extracted defect information;
generating, via the processor, second virtual defect data by synthesizing the first virtual defect data with non-defect data representing the product without the defect and a virtual mask image representing the defect extracted from the first virtual defect data as a binary image, and;
generating, via an artificial intelligence generative model, final virtual defect data based on the second virtual defect data.

13. The method of claim 12, wherein the generated first virtual defect data further includes a number of defects indicated by the captured image of the product.

14. The method of claim 12, wherein the artificial intelligence generative model outputs a higher quality second virtual data than the input second virtual defect data by increasing a size or resolution of the input second virtual defect data.

15. The method of claim 14, further comprising:
blending, via the processor, boundaries and artifacts of the second virtual defect data.

16. The method of claim 12, further comprising:
manually inputting, via a user input unit, the first virtual defect data.

17. The method of claim 12, further comprising:
generating, via the processor, the first virtual defect data by arbitrarily setting the at least one of the location, the size, and the shape of the defect.

18. The method of claim 12, wherein the artificial intelligence generative model comprises a Generative Adversarial Network (GAN) model including a generative model and a discriminative model, and
  wherein the final virtual defect data is blended with respect to the second virtual defect data.

19. The method of claim 18, wherein the artificial intelligence generative model comprises a plurality of stages in which a result value is an input value of a next stage,
  wherein the method further comprises scaling the second virtual defect data based on a number of the plurality of stages, and generate the final virtual defect data by inputting the scaled second virtual defect data to the plurality of stages, and
  wherein the final virtual defect data has a higher similarity to the defect than the second virtual defect data.

20. The method of claim 12, wherein the artificial intelligence model comprises a Generative Adversarial Network (GAN) model including a generative model and a discriminative model,
  wherein the generative model is configured to generate the final virtual defect data based on the non-defect data and the defect information, and
  wherein the discriminative model is configured to determine whether an input image is actual data or virtual defect data.

* * * * *